United States Patent
McDonald et al.

(10) Patent No.: US 10,371,939 B2
(45) Date of Patent: Aug. 6, 2019

(54) APPARATUS PROVIDING OVER-TRAVEL PROTECTION FOR ACTUATORS

(71) Applicant: Texas Instruments Incorporated, Dallas, TX (US)

(72) Inventors: William Craig McDonald, Allen, TX (US); James Norman Hall, Parker, TX (US); Adam Joseph Fruehling, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/836,536

(22) Filed: Dec. 8, 2017

(65) Prior Publication Data
US 2019/0179135 A1    Jun. 13, 2019

(51) Int. Cl.
*G02B 26/08* (2006.01)

(52) U.S. Cl.
CPC .............................. *G02B 26/0841* (2013.01)

(58) Field of Classification Search
CPC ............... G02B 26/0841; G02B 26/06; G02B 26/0833; G02B 27/425; G02B 7/1821
USPC ..................................................... 359/221.2
See application file for complete search history.

(56) References Cited

U.S. PATENT DOCUMENTS

| | | | |
|---|---|---|---|
| 5,212,582 A | 5/1993 | Nelson | |
| 5,719,695 A | 2/1998 | Heimbuch | |
| 6,028,689 A | 2/2000 | Michalicek et al. | |
| 6,329,738 B1 | 12/2001 | Hung et al. | |
| 6,867,897 B2 | 3/2005 | Patel et al. | |
| 7,477,440 B1 | 1/2009 | Huang | |
| 2003/0168928 A1 | 9/2003 | Clark et al. | |
| 2004/0248417 A1* | 12/2004 | Malone | B81C 1/00317 438/692 |
| 2006/0119922 A1 | 6/2006 | Faase et al. | |
| 2013/0278912 A1* | 10/2013 | Owa | G02B 26/06 355/71 |

FOREIGN PATENT DOCUMENTS

JP      2013171219 A      9/2013

OTHER PUBLICATIONS

International Search Report for PCT/US2018/064754 dated Apr. 4, 2019.
International Search Report for PCT/US2018/064757 dated Apr. 11, 2019.

* cited by examiner

*Primary Examiner* — Euncha P Cherry
(74) *Attorney, Agent, or Firm* — Michael A. Davis, Jr.; Charles A. Brill; Frank D. Cimino

(57) ABSTRACT

One or more apparatus providing over-travel protection for actuators are disclosed. An example apparatus includes a mirror; a first plate coupled to the mirror; and a support post coupled the first plate, the support post structured to prevent the mirror from moving within a threshold distance to a second plate.

19 Claims, 10 Drawing Sheets

APPARATUS PROVIDING OVER-TRAVEL PROTECTION FOR ACTUATORS

CROSS-REFERENCE TO RELATED APPLICATIONS

This application is related to co-owned co-pending U.S. patent application Ser. No. 15/836,521, filed Dec. 8, 2017.

FIELD OF THE DISCLOSURE

This disclosure relates generally to actuators and, more particularly, to one or more apparatus providing over-travel protection for actuators.

BACKGROUND

Actuators (e.g., electrostatic and non-electrostatic) are used in various technologies. For example, actuators may be used in spatial light modulators to spatially vary modulation of a beam of light. Such spatial light modulators operate pixels including a mirror that moves to vary the intensity and/or phase of the beam of light. In some examples, microelectromechanical actuator systems are utilized to vary the position (e.g., move) the mirrors to change intensity and/or phase of the beam of light. Such microelectromechanical actuator systems include a base electrode and a spring electrode coupled to the mirror. When a voltage differential is created between the base electrode coupled to a base of a pixel and the spring electrode, the spring electrode moves toward the base electrode, thereby moving the mirror to a different position. Such microelectromechanical system spatial light modulators are used in, for example, high dynamic range cinema, light detection and ranging systems, high volume optical switching (e.g., used in telecom or server farms), microscopy/spectroscopy/adaptive optics (e.g., used in astronomy, ophthalmology, machine vision, etc.), and holographic displays.

SUMMARY

Certain examples explain an apparatus providing over-travel protection for actuators. The example apparatus includes a mirror; a first plate coupled to the mirror; and a support post coupled to the first plate, the support post structured to prevent the mirror from moving within a threshold distance to a second plate.

Certain examples explain an apparatus providing over-travel protection for actuators. The example apparatus includes a mirror attached to a first plate; a support post coupled to the first plate, the support post including a ledge that is between a second plate by the mirror, the mirror partially overlapping the ledge; and the second plate to control a position of the mirror.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Spatial light modulators spatially vary modulation of a beam of light to control the properties of the beam of light. Spatial light modulators are used in projectors, high dynamic range cinema, light detection and ranging systems, high volume optical switching (e.g., used in telecom or server farms), microscopy/spectroscopy/adaptive optics (e.g., used in astronomy, ophthalmology, machine vision, etc.), holographic displays, etc. To modulate the beam of light, pixels are used including mirrors that can be adjusted (e.g., moved or displaced) in order to change the properties (e.g., intensity and/or phase) of the reflected beam of light. In some examples, spatial light modulators use actuators to move the mirrors. In some examples, spatial light modulators use microelectromechanical systems (MEMS) to move the mirrors based on a combination of an electrostatic force and a spring force.

A Parallel-plate electrostatic actuator (e.g., used in MEMS) is a device that utilizes electrostatic force to move an object (e.g., a mirror of a spatial light modulator pixel). For example, a MEMS pixel includes a first electrode coupled to a mirror. The first electrode is also anchored to an attachment, some distance d, above (e.g., in a vertical construction) a second electrode. The first electrode includes one or more flexural beams to maintain a position of the first electrode (e.g., the distance d above the second electrode in a vertical construction), but allow the first electrode to move in and out (e.g., up and down in a vertical construction) based on a second force overcoming the spring force of the flexural beams. The first electrode is grounded and the second electrode is coupled to a voltage regulator. The voltage regulator applies a bias voltage to the second electrode. When the bias voltage applied to the second electrode increases, the voltage differential between the first electrode and the second electrode generates an electrostatic force that drives the first electrode toward the second electrode, thereby moving the mirror toward the second electrode. Additionally or alternatively, the amount of area of the second (e.g., base) electrode that applies the bias voltage may increase, thereby increasing the electrostatic force and pulling the first electrode closer to the second electrode, such as used in digital style electrodes. As the voltage decreases (and/or the amount of area applying the voltage on the second electrode decreases), the electrostatic force decreases to push the first electrode away from the second electrode (e.g., due to the force of the flexural beams). In this manner, a controller can control the voltage and/or amount of area applying a voltage on the second electrode to control the position of the first electrode, thereby controlling the position of the mirror. The amount of travel of a mirror corresponds to an achievable phase modulation of a device.

Electrostatic actuators (e.g., included in MEMS pixels) include a pull-in point, also referred to herein as a collapsing point or an instability point, corresponding to a maximum distance that the first electrode can travel before a collapse occurs (e.g., the first electrode collapses toward the second electrode, thereby destroying the functionality of the pixel). The pull-in point is an equilibrium point, beyond which the system is unstable. The stability of the system depends on the differential of the net force (e.g., $$\frac{dF}{dx}\bigg|_{x=x_e} < 0$$

stable equilibrium and $$\frac{dF}{dx}\bigg|_{x=x_e} > 0$$

unstable equilibrium where $x_e$ is the equilibrium displacement). The net force is represented a combination of the electrostatic force and the spring force (e.g., $$F = F_{electrostatic} + F_{mechanical} = \frac{\epsilon A}{2(d-x)^2}V^2 - kx,$$

where $\in$ is the permittivity of the dielectric between the two electrodes, A is the Area of the base electrode, x is the displacement of the top electrode, and –kx is the restoring force in a linear flexural beam). Accordingly, the first electrode cannot maintain a position more than a d/3 threshold distance (e.g., 1/3 of the electrostatic gap) to the second electrode. For example, if the spring electrode is (without any electrostatic force applied) 900 micrometers from the base electrode, the spring electrode may only travel 300 micrometers toward the base electrode before pull-in occurs. Examples disclosed herein include structure(s) to prevent over-travel (e.g., the first and second electrodes from being pulled together beyond the point of instability), thereby eliminating the possibility of collapse.

Other types of actuators may have a similar problem. For example, a piston of an actuator may be attached to an object to move the object in or out (e.g., up and down in a vertical construction). In some examples, pulling the piston all the way toward the actuator's base may cause the actuator to get stuck due to stiction forces that apply to the area of the object and actuator base that are in contact. Examples disclosed herein further include structure(s) to prevent over-travel (e.g., the piston from getting too close to the actuator's base), thereby eliminating the possibility of stiction forces and stuck actuators.

One conventional technique for (A) preventing electrostatic actuators from reaching the collapsing point and/or (B) avoiding stiction forces in non-electrostatic actuators includes programming the controller of an actuator to control the voltages applied the actuator to prevent over-travel. However, user and/or software error may cause collapsing and recall of devices programmed with such conventional techniques. Another conventional technique for (A) preventing electrostatic actuators from reaching the collapsing point and/or (B) avoiding stiction forces in non-electrostatic actuators includes using feedback control voltage using a sensor to sense actuator position. However, user and/or software error of such a conventional technique also collapsing and recall of devices programmed with such conventional techniques. Additionally, such a conventional technique requires more space and hardware to implement, thereby increasing the cost and decreasing board space. Examples disclosed herein include support posts that act as mechanical stops for a structural plate that couples to the top plate of an actuator, thereby preventing the top plate of the actuator from moving past (e.g., below in a vertical construction) a predefined point (e.g., based on the height of the support posts). For electrostatic actuators, examples disclosed herein include support posts that are structured to prevent the top plate of the actuator from reaching the collapsing point. For non-electrostatic actuators, examples disclosed herein include support posts that are structured to prevent the top plate from touching the base of the actuator, thereby prevent stiction that may cause an actuator to stick.

Figure 1A:
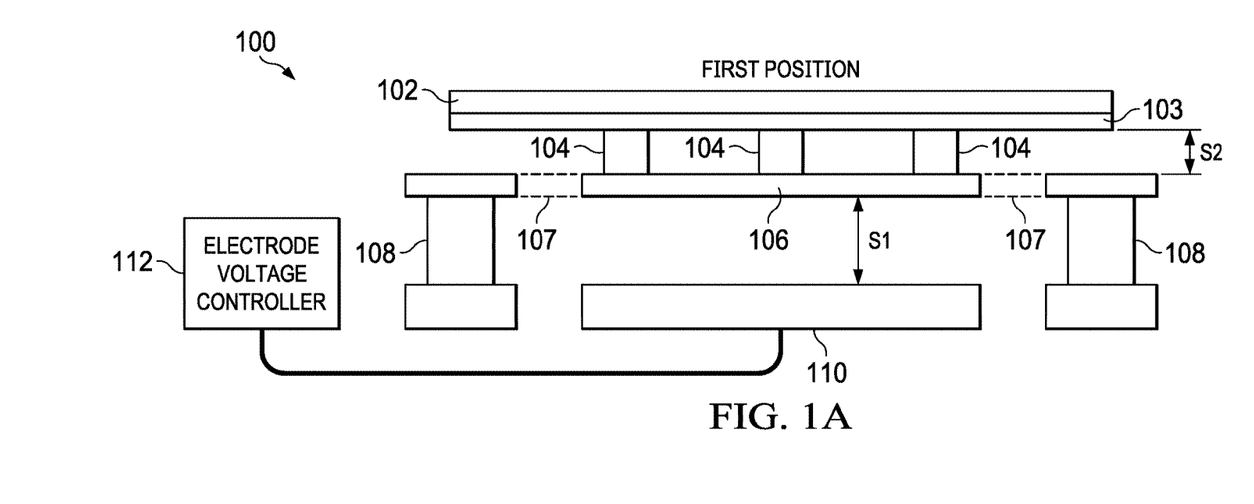
FIGS. 1A-1B are illustrations of an example electrostatic actuator with over-travel protection.
Figure 1B:
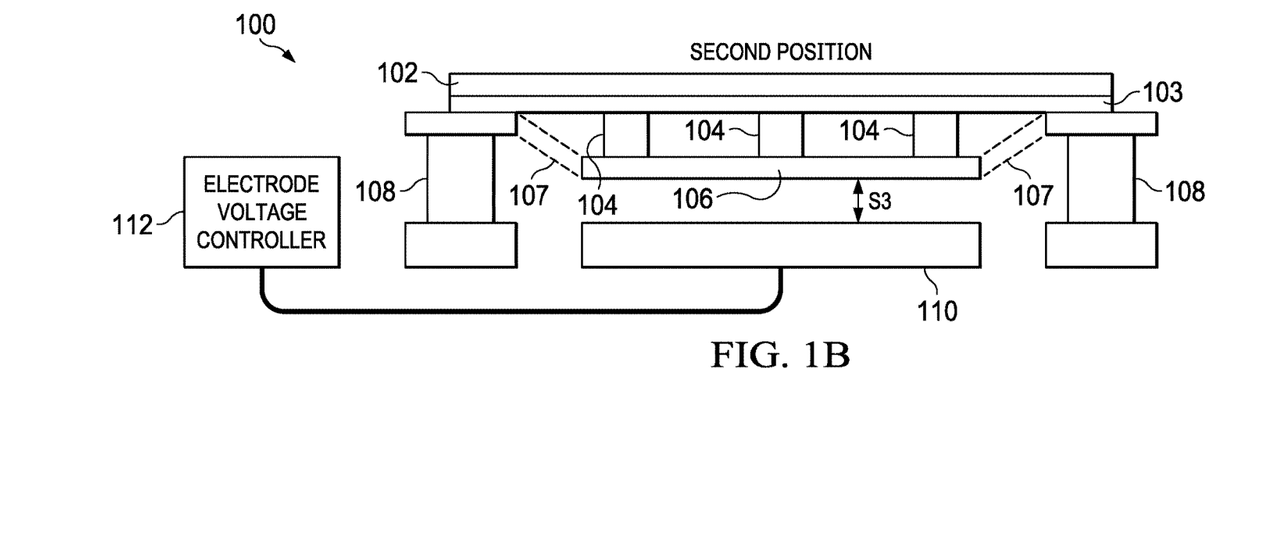

FIGS. 1A-1B illustrate of two positions of an example structure 100 (e.g., a pixel structure) of parallel-plate electrostatic actuator (e.g., to implement a MEMS spatial light modulator). The example structure 100 of FIGS. 1A-1B includes an example mirror 102, an example structure plate 103, example mirror attachments 104 (e.g., mirror vias), an example top plate 106 (e.g., a first plate), example flexural beams 107, example support posts 108, an example base plate 110 (e.g., a second plate), and an example electrode voltage controller 112.

The example mirror 102 of FIGS. 1A-1B reflects a beam of light in two or more directions depending on the position of the mirror. For example, the mirror 102 is extended in a first position (e.g., a neutral position when no voltage is applied to the example base plate 110) to reflect light in a first direction and the example mirror 102 is retracted to a second position to reflect light in a second direction. For example, the first position may correspond to a reflection to a projector lens to focus on a display plane (e.g., corresponding to an "on" position) and the second position may correspond to a reflecting to a light absorber (e.g., corresponding to an "off" position). Additionally or alternatively, the mirror 102 may be positioned to various other heights to reflect a beam of light to various other devices. The example mirror 102 is supported by (e.g., hosted within) the example structural plate 103. The example mirror 102 is attached to the example top plate 106 by coupling the example structural plate 103 to the example mirror attachments 104, which are coupled to the example top plate 106. In some examples, the example structural plate 103 may be removed and the example mirror 102 may be coupled directly to the example mirror attachments 104. In some examples, the mirror 102 may be removed or replaced with another object. The mirror 102 and/or structural plate 103 are structured to be larger than the top plate 106, such that the mirror 102 and/or structural plate 103 overlap the example structural posts 108. In this manner, the structural posts 108 act as a mechanical stop to the example mirror 102 and/or structural plate 103 past a predefined position corresponding to the height of the support posts 108. Although the example structure 100 of FIGS. 1A-1B includes three mirror attachments 104, the structure 100 may include any number of mirror attachment(s).

The example top plate 106 of FIGS. 1A-1B is an electrode including the example flexural beams 107. The example top plate 106 is coupled to the example mirror 102/structural plate 103 via the example mirror attachments 104. The flexural beams 107 of the top plate 106 correspond to a mechanical spring constant that, when stretched, applies a mechanical force in the opposite direction of the stretching. The flexural beams 107 are attached to the example support posts 108, which may be grounded. In this manner, when an electrostatic force is applied to the example top plate 106 in a downward motion, the flexural beams 107 extend toward the example base plate 110, causing the example top plate 106 to lower, thereby causing the example mirror 102 to move from the first position toward the second position. In some examples, the top plate 106 and the flexural beams 107 are made with the same material. Accordingly, the example mirror attachments 104 may provide rigidity to the example top plate 106 to ensure that the top plate 106 does not flex as the electrostatic force increases.

Although the example structure 100 of FIGS. 1A-1B displays a first and second position, the electrostatic force may correspond to a difference value that positions the example top plate 106 to a plurality of different positions between the first position and the second position. Additionally, in some examples, the top plate 106 may be at a location beyond (e.g., above in the vertical construction) the first position, as described below in conjunction with FIGS. 4A-4D. The example top plate 106 may be any shape (e.g., a square-shape, a rectangle-shape, a circular shape, a hexagon shape, etc.). Example geometries that may be used for the example top plate 106 are further described below in conjunction with FIGS. 4A-4D.

The example support posts 108 of FIGS. 1A-1B are structured to prevent the example top plate 106 from moving too close to the base plate 110 by acting as a stop to the bottom of the example mirror 102/structural plate 103. The example support posts 108 provide a mechanical stopping structure that eliminates the risk of collapse. To prevent the top plate 106 from getting too close to the example base plate 110, the example support posts 108 are to be a length longer than the example mirror attachments 104 (e.g., S1>S2). In some examples, the support posts 108 are designed such that when the example top plate 106 is in the second position (e.g., fully drawn in), the distance (S3=S1−S2) between the top plate 106 and the base plate 110 is more than the collapsing distance. In this manner, if the example mirror 102 is fully drawn in (e.g., at the second position), there is no risk of the example top plate 106 coming into direct contact with and/or getting to close to the example base plate 110 because the S3 distance is greater than or equal to the d/3 collapsing point. In some examples, the materials used to make the example structural plate 103 of the example mirror 102, the example mirror attachments 104, the example top plate 106, and/or the example support posts 108 are made of a substantially similar material. In this manner, the voltage potential between any of the example structural plate 103, the example mirror attachments 104, the example top plate 106, and/or the example support posts 108 is substantially zero. In some examples, the support posts 108 include a springed edge, to allow the example mirror 102 to be driven to a lower position (e.g., corresponding to an overdrive), as further described below in conjunction with FIGS. 4A-4D. In some examples, the support posts 108 act as stops to two of more mirrors in an array of pixels, as further described below in conjunction with FIGS. 5-7.

The example base plate 110 of FIGS. 1A-1B is an electrode that receives a voltage from the example electrode voltage controller 112. The voltage on the example base plate 110 generates an electrostatic force that, when stronger than the spring constant of the example flexural beams 107, causes the top plate 106 to move toward the example base plate 110. The higher the voltage applied on the example base plate 110 and/or the larger the area of the voltage being applied by the base plate 110, the more the top plate 106 is displaced. In some examples, the base plate 110 is an analog-style electrode, in which the voltage is equally spread throughout the base plate 110. Accordingly, the electrode voltage controller 112 outputs an analog voltage in order to move the top plate 106 and the mirror 102 to different positions (e.g., each voltage level corresponding to a different position). In some examples, the base plate 110 is a digital-style electrode, in which the voltage is applied to different areas (e.g., bits) of the base plate 110. For example, the base plate 110 may include three bits (bit_0, bit_1, and bit_2), where each bit mutually corresponds to 33% of the area of the base plate 110. Accordingly, if 5 V is applied to bit_0, the example top plate 106 is moved to a first position, if 5 V were applied to bit_0 and bit_1, the example top plate 106 is moved to a second position (lower than the first position), and if 5 V were applied to bit_0, bit_1, and bit_2, the example top plate 106 is moved to a third position (lower than the second position).

The example electrode voltage controller 112 of FIGS. 1A-1B controls the displacement of the example mirror 102 by transmitting a voltage to the example base plate 110 to generate an electrostatic force between the base plate 110 and the top plate 106, thereby causing the top plate 106 (and thus, the mirror 102) to move toward the example base plate 110. The example electrode voltage controller 112 applies the voltage to correspond to a distance based on a desired output (e.g., received from another computing device or circuit). The electrode voltage controller 112 of FIGS. 1A-1B may generates different types of signals to control the position of the example mirror 102. For example, the electrode voltage controller 112 may generate a periodic signal (e.g., a digital pulsing signal or a sinusoid) causing the example top plate 106 (e.g., and thus the example mirror 102) to be pulled toward and/or away from the example base plate 110 in a periodic fashion. Different example waveforms that may be produced by the example electrode voltage controller 112 are described below in conjunction with FIG. 8. Although the example structure 100 of FIGS. 1A-1B includes the example top plate 106 and the example base plate 110, other orientations may be utilized, for example, the example top plate 106 and the example base plate 110 may be on their side or upside down, thereby corresponding to different orientations. Accordingly, the top plate 106 and the base plate 110 may be referred to as a first plate and a second plate without describing the orientation.

Figure 2A:
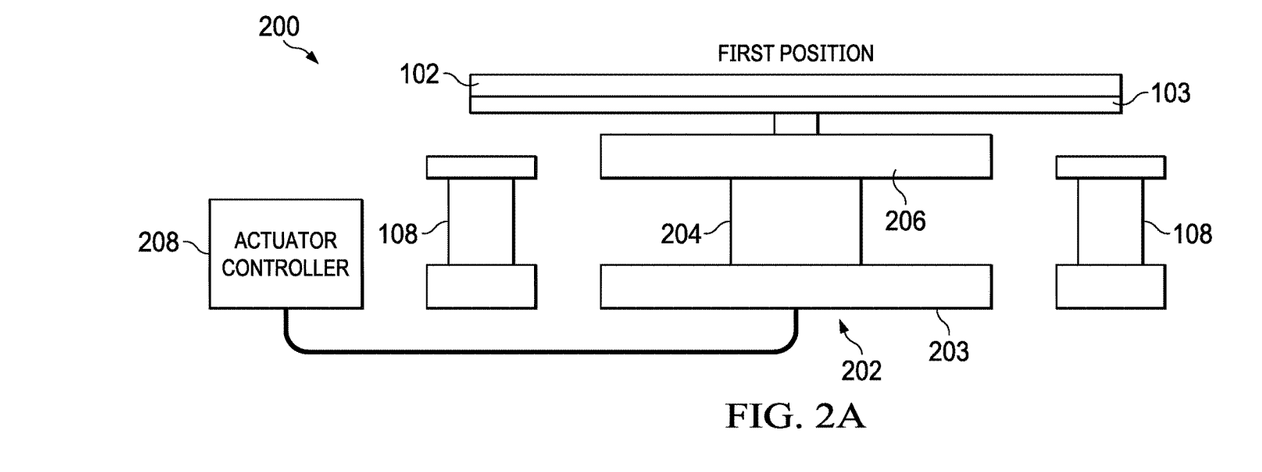
FIGS. 2A-2B are illustrations of an example non-electrostatic actuator with over-travel protection.
Figure 2B:
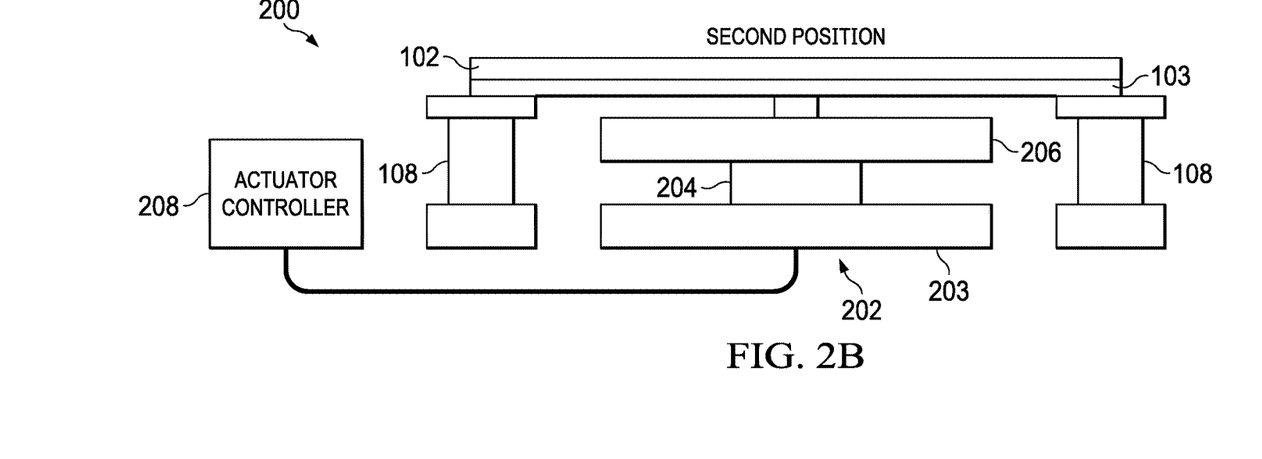

FIGS. 2A-2B illustrate two positions of an example structure 200 (e.g., a pixel structure) of a parallel plate non-electrostatic actuator (e.g., to implement a spatial light modulator) that is positioned by an example actuator 202. The example structure 200 of FIGS. 2A-2B includes the example mirror 102, the example structure plate 103, and the example support posts 108 of FIGS. 1A-1B. The example structure 200 of FIGS. 2A-2B further includes an example actuator 202 enclosed in an example actuator base 203 to move an example piston 204 based on a received signal from an example actuator controller 208.

The example actuator 202 of FIGS. 2A-2B is a type that includes a motor encased in the example actuator base 203 that is capable of moving the example piston 204 in or out (e.g., up and down in the example of FIGS. 2A-2B) to preset positions based on a received signal. For example, the actuator 202 may push the example piston 204 out and/or may pull the example piston 204 in. The example piston 204 moves the example middle layer 206 so that when the example actuator 202 pushes the example piston 204 up, the example middle layer 206 likewise raises up (e.g., push out) and when the example actuator 202 pushes the example piston 204 down (e.g., pull in), the example middle layer 206 likewise moves down. Because the example middle layer 206 is coupled to the example mirror 102 and/or the example structure plate 103, movement of the example middle layer 206 translates to movement of the example mirror 102/ structure plate 103. Accordingly, the position of the example mirror 102/structure plate 103 is dependent on the position of the example piston 204, which is controlled by the example actuator 202. As described above, although the example structure 200 includes the example structure plate 103 and the example mirror 102, the example structure 200 may include either of the example structure plate 103 or the example mirror 102. In some examples, the actuator 202 is capable of moving the example piston 204 to two predefined positions. In some examples, the actuator 202 is capable of moving the example piston 204 to any position between a drawn in position to a fully extended position.

The example actuator controller 208 of FIGS. 2A-2B transmits a signal to the example actuator 202 to move the example piston 204 (e.g., and thus the example mirror 102) to one or more positions, defined by the signal. The signal may correspond to different waveforms (e.g., pulses, sinusoids, etc.) to drive the example piston 204. Different example waveforms that may be the example electrode actuator controller 208 are described below in conjunction with FIG. 8.

The example support posts 108 of FIGS. 2A-2B are structured prevent the the example middle layer 206 from moving too close to the actuator base 203 by acting as a stop to the bottom of the example mirror 102/structural plate 103. For example, when a galvanic potential is present and/or when stiction is a concern (e.g., in piezoelectric actuators or accelerometers), it may be harmful to allow the example middle layer 206 to touch, or otherwise come in contact with, the example actuator base 203 and generating a stiction force. Accordingly, the example support posts 108 may be structured to prevent the example middle layer 206 from being pulled past a predetermined distance to the example actuator base 203, thereby eliminating the problems associated with galvanic potential and/or stiction.

Figure 3A:
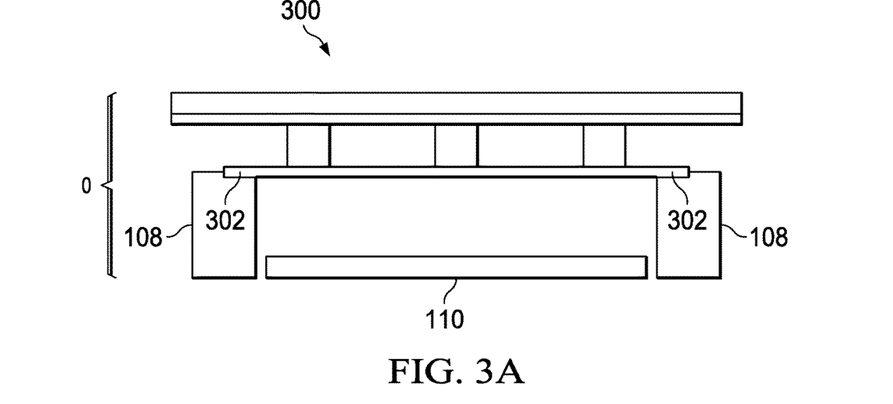
FIGS. 3A-3B are illustrations of an alternative example electrostatic actuator with over-travel protection.
Figure 3B:
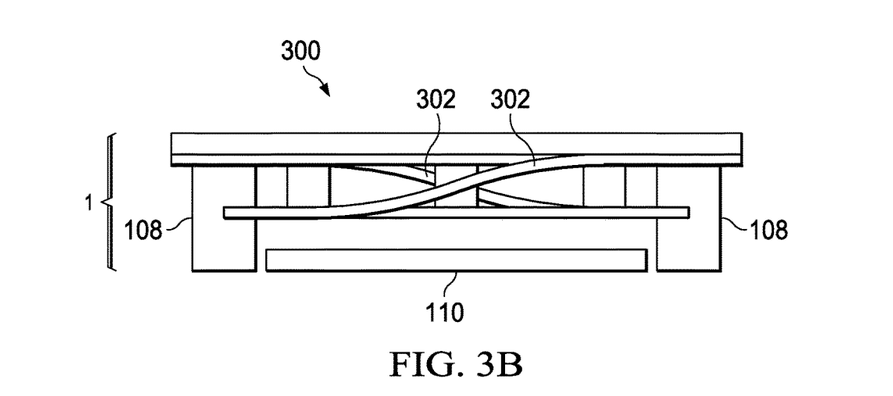
Figure 4A:
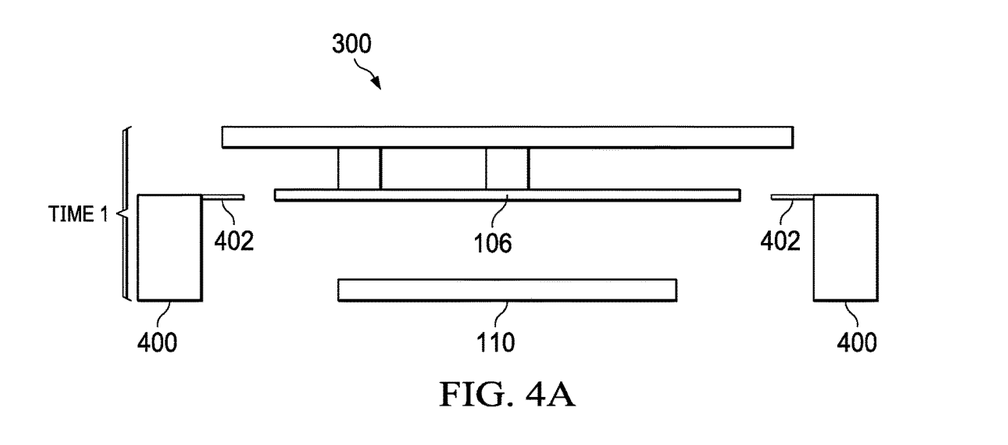
FIGS. 4A-4D are illustrations of an example springed structural posts providing over-travel protection.
Figure 4B:
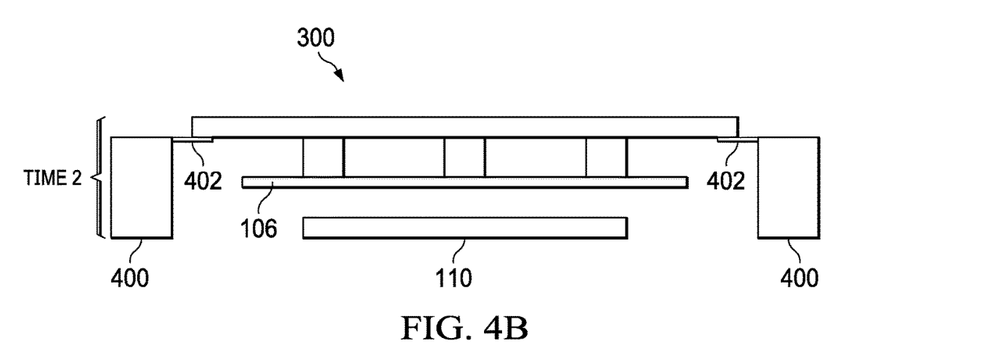
Figure 4C:
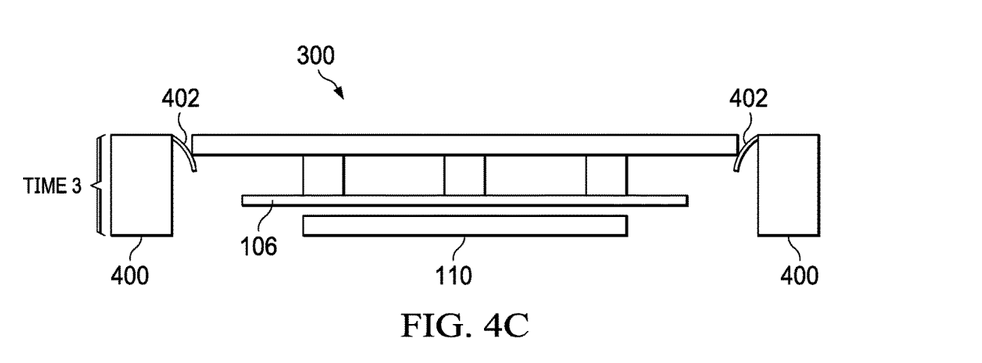
Figure 4D:
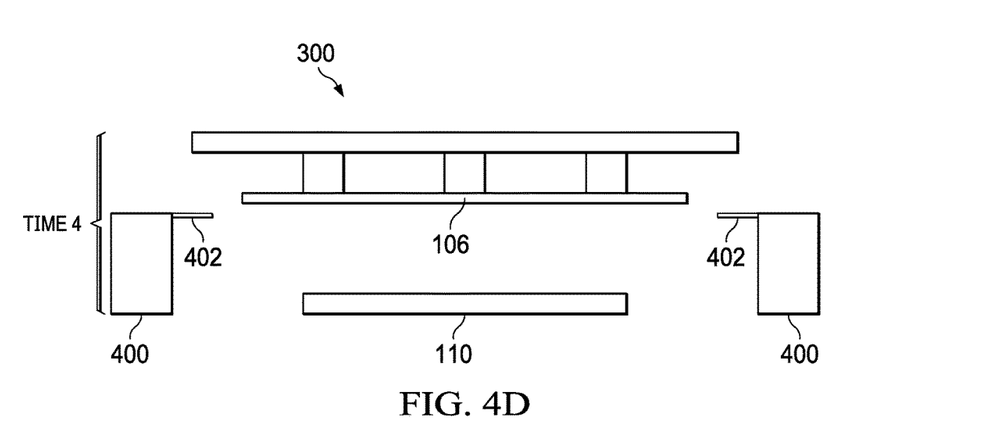
Figure 5A:
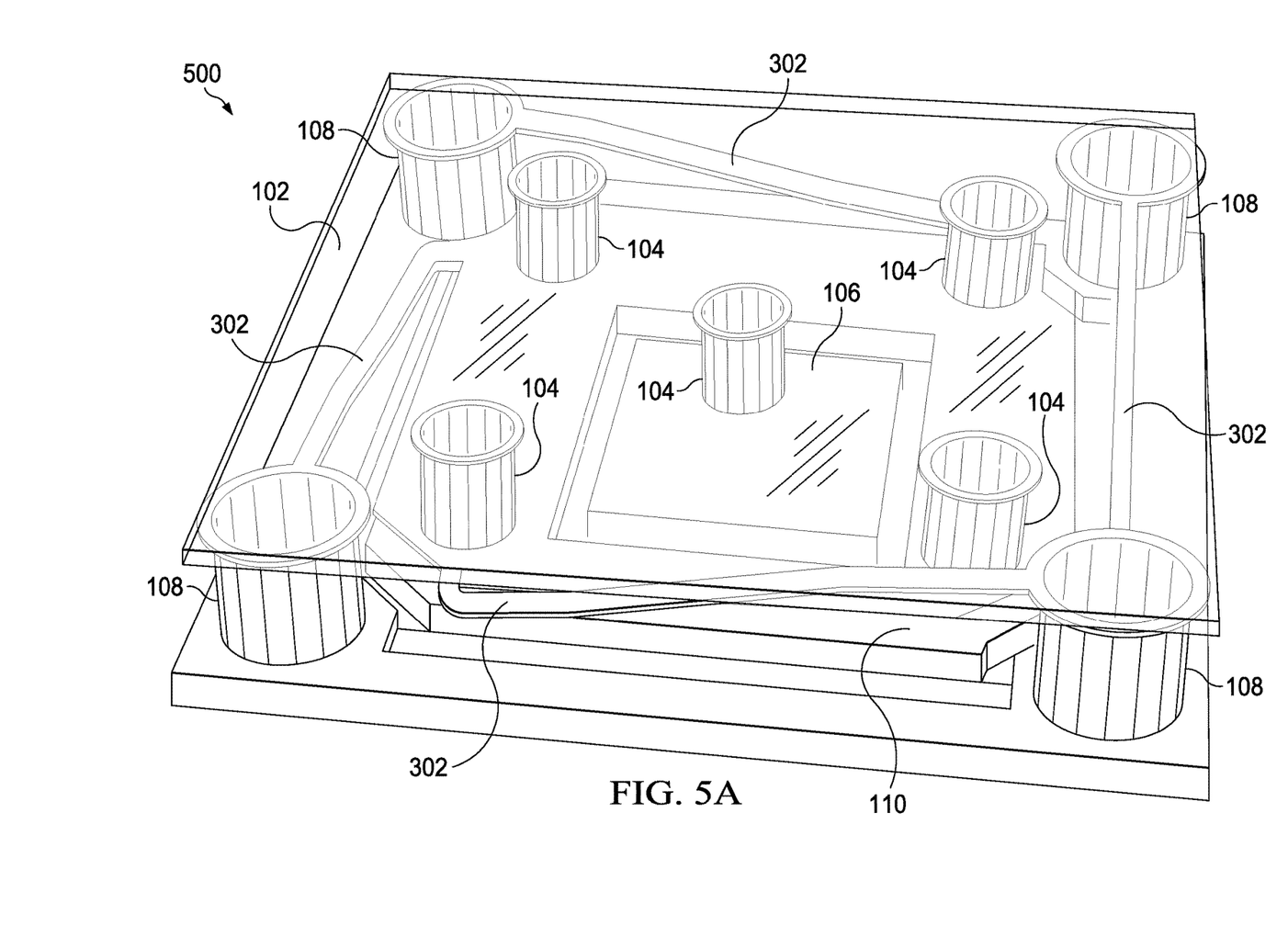
FIGS. 5A-5D are illustration of different example structure geometries that may be utilized in the example actuators of FIGS. 1-3.
Figure 5B:
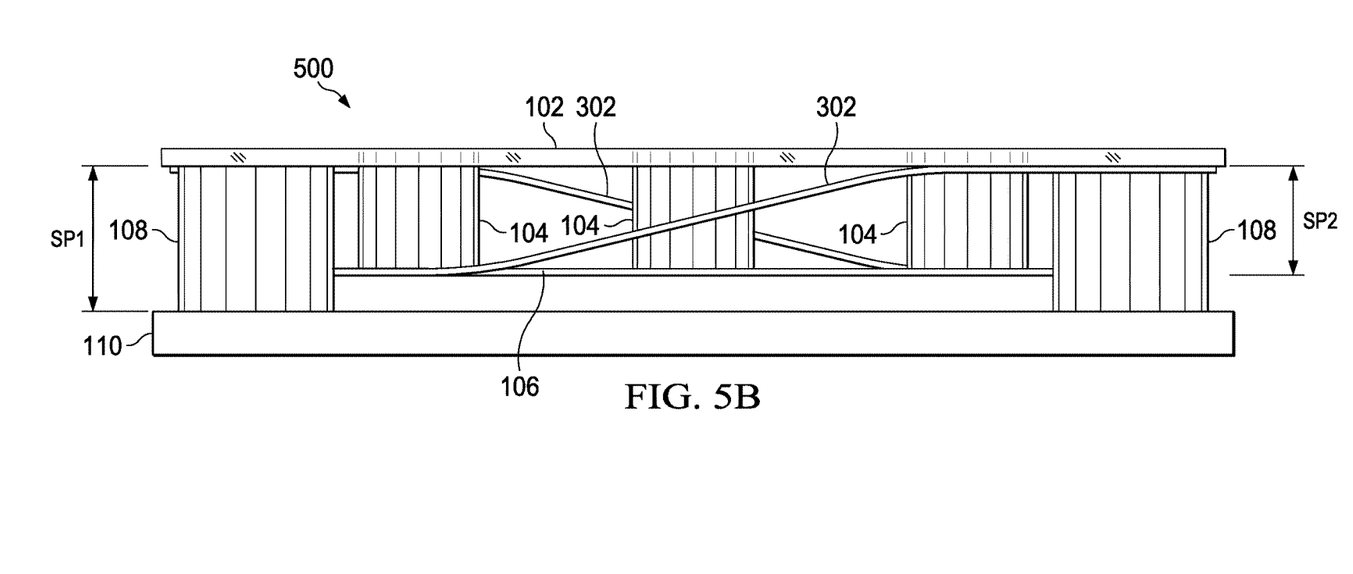
Figure 5C:
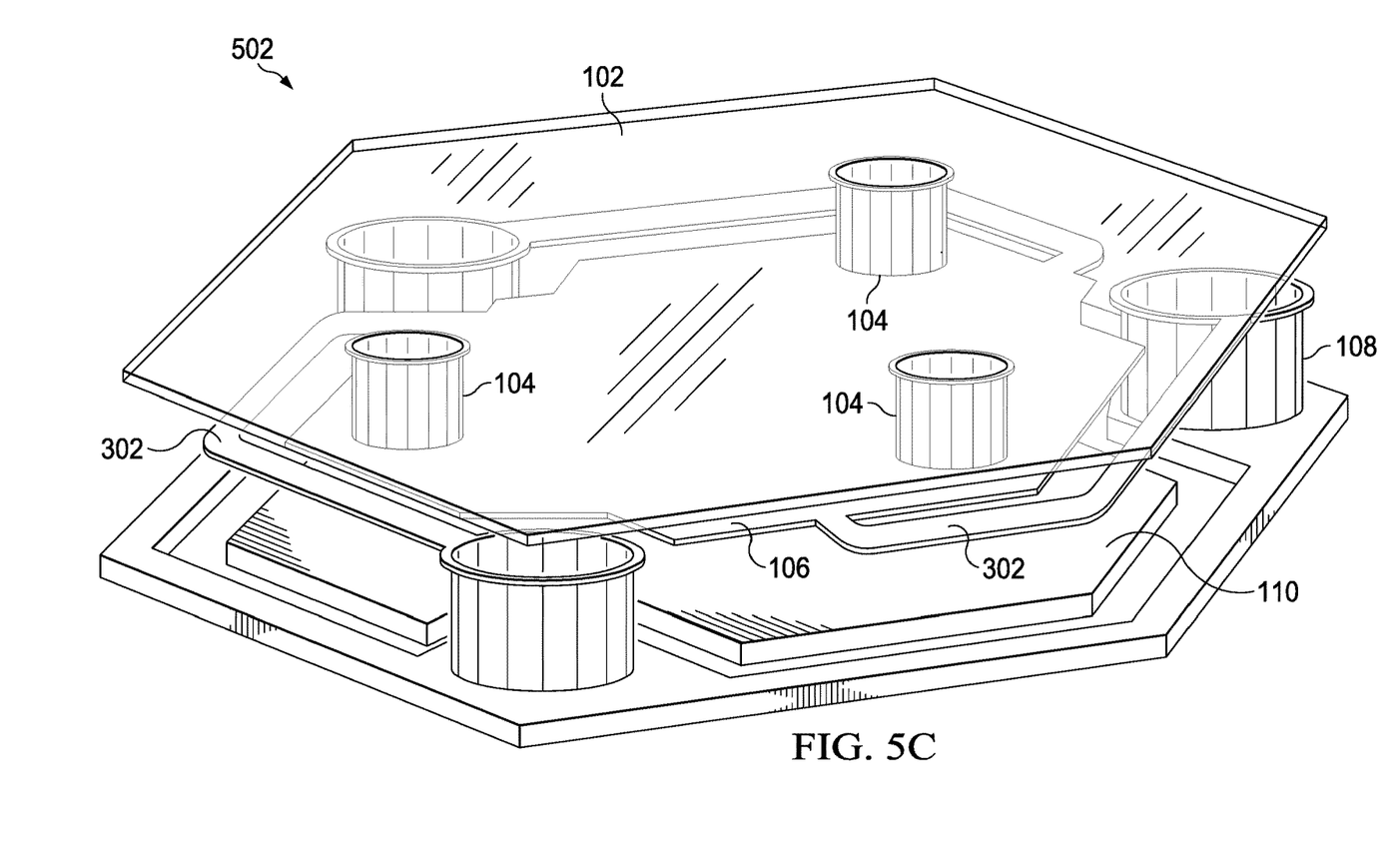
Figure 5D:
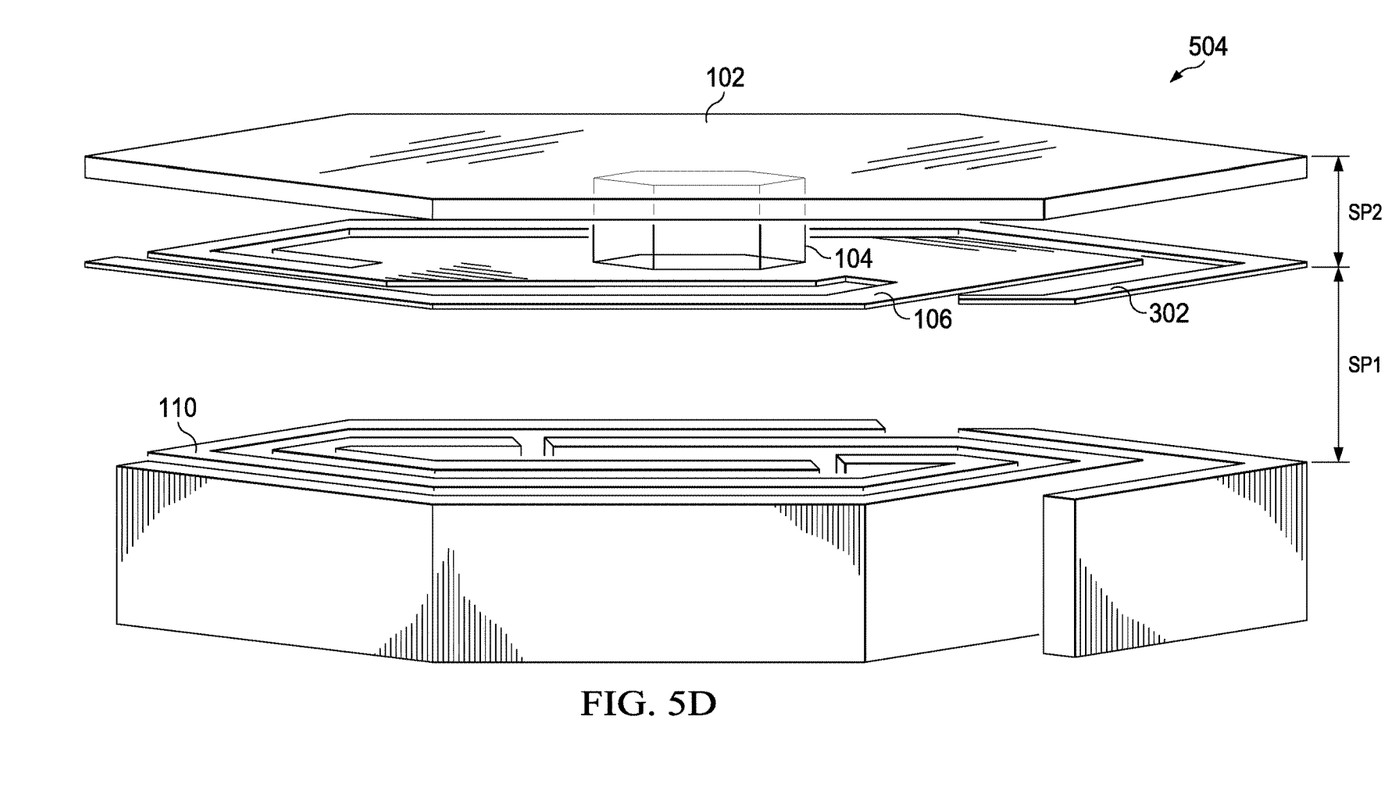

FIGS. 3A-3B illustrate two positions of an alternative example structure 300 (e.g., pixel structure) of a parallel-plate actuator (e.g., to implement a MEMS spatial light modulator). The example structure 300 of FIGS. 3A-3B includes the example top plate 106, the example support posts 108, and the example base plate 110 of FIGS. 1A-1B. The example structure 300 further includes example extended flexural beams 302.

The example extended flexural beams 302 of FIGS. 3A-3B work in a similar manner to the example flexural beams 107 of FIGS. 1A-1B. However, the example extended flexural beams are longer and/or may wrap around the outside of the example top plate 106, thereby providing more spring/flexibility than the example flexural beam 107 of FIGS. 1A-1B. More spring allows the example top plate 106 to move with less electrostatic force. In this manner, the example electrode voltage controller 112 moves the example extended flexural beam 302 with less voltage, thereby conserving energy. In some examples, more spring may allow the example top plate 106 to be pushed beyond (e.g., higher) the neutral position (e.g., the first position) by applying an overdrive voltage, as further described below in conjunction with FIGS. 4A-4D. Although the example structure 300 includes the example base plate 110 to control the position of the example top plate 106, the example structure 300 may alternatively include the example actuator 202 of FIGS. 2A-2B. The example extended flexural beams 302 are further described below in conjunction with FIGS. 5A-5D.

FIGS. 4A-4D illustrate four different times/positions of an actuator with over-travel protection using a spatial light modulator including example springed support posts 400 of FIGS. 4A-4D. The example of FIGS. 4A-4D includes the example top plate 106, the example base plate 110 of the example structure 300 of FIGS. 3A-3B. The example of FIGS. 4A-4D further includes the example springed support posts 400 with example spring ledges 402. Although the example of FIGS. 4A-4D includes the example structure 300 of FIGS. 3A-3B, the example springed support posts 400 may be implemented with any one of the example structures 100, 200, 300 of FIGS. 1-3. Additionally, the example flexural beams 107/example extended flexural beams 302 of FIGS. 1 and 3 are removed from FIGS. 4A-4D to provide a clear view of the example springed support ports 400. However, although not illustrated in the example of FIGS. 4A-4D, the example flexural beams 107/example extended flexural beams 302 can attach the example top electrode 106 to the example springed support posts 400.

The example springed support posts 400 of FIGS. 4A-4D include the example spring ledges 402 to allow the example top plate 106 to be driven closer to the example base plate 110, thereby corresponding to an overdrive position. In the illustrated example, the example springed support posts 400 are positioned such that the mirror overlaps the example spring ledges 402. The example flexural beams 107/the example extended flexural beams 302 (not shown) may be coupled to the example springed support posts 400 or to the example spring ledges 402. The example spring ledges 402 may be structured to include a spring constant that prevents the example top plate 106 from collapsing to the example base plate 110 by providing an additional force to counteract the electrostatic force. In this manner, the example top plate 106 may move in a larger range. Additionally, the example springed ledges 402 may provide additional upward force to spring the example top plate 106 to a position higher than the conventional extended position (e.g., corresponding to the position of the example structure 300 at time 4.

At the first time, the example structure 300 is in a conventionally fully extended neutral position, where the example top plate 106 is level with the top of the example springed support posts 400. At the second time, a voltage is applied to the example base plate electrode 110 to cause an electrostatic force that pulls the example top plate 106 toward the example base plate 110. At the second time, the mirror is in contact with the example spring ledge 402. The spring ledge 402 has enough rigidity to hold the mirror at the position of the second time. However, if an overdrive voltage (e.g., a voltage higher than a bias voltage) is applied to the example bottom plate 110, the electrostatic force will increase to overcome the rigidity of the example spring ledge 402, thereby causing the example top plate 106 to be pulled even closer to the example base plate 110, as shown at the third time. If the voltage applied to the example base plate 110 is substantially reduced, the example spring ledge 402 provides enough upward force to push the example top plate 106 upward, thereby reducing the risk of collapse. Additionally, the example spring ledge 402 may provide enough force to push (e.g., launch) the example top plate 106 beyond (e.g., above in the vertical construction) the neutral (e.g., conventional fully extended) position of the first time, as shown at the fourth time.

FIGS. 5A-5D illustrate three example plate geometries 500, 502, 504 (e.g., pixel geometries) that may be utilized to implement the example structures 100, 200, 300 of FIGS. 1-3. The example plate geometries 500, 502, 504 include the example mirror 102, the example mirror attachments 104, the example top plate 106, the example support posts 108, the example base plate 110, and the example extended flexural beams 302 of FIGS. 1-3. Although FIGS. 5A-5D illustrate the example plate geometries 500, 502, 504, other geometries (e.g., triangle, circle, etc.) may additionally or alternatively be used. Additionally, items of the example plate geometries 500, 502, 504 may be added, removed, or changed. For example, the example base plate 110 may be placed with the example actuator 202, the example support posts 108 may be replaced with the example springed support posts 400, the number of the example mirror attachments 104 may be adjusted, etc.

The first example plate geometry 500 of FIGS. 5A-5D is a square-based geometry. The first example plate geometry 500 includes a square mirror 102, a square top plate 106, and a square base plate 110. The first example plate geometry 500 further include five mirror attachments 104 to couple the example top plate 106 to the example mirror 102. Alternatively, any number of mirror attachments 104 may be used to couple the example top plate 106 to the example mirror 102. The example extended flexural beams 302 of the example plate geometry 500 attach to the example support posts 108 and the example top plate 106. Alternatively, the example flexural beam 107 of FIGS. 1A-1B may attach to the example support posts 108 and the example top plate 106.

The second example plate geometry 502 of FIGS. 5A-5D is a three-legged hexagon-shaped pixel structure that increases the area-to-perimeter ratio of the example top plate 106, thereby allowing the voltage applied to the example base plate 110 to be significantly lower than conventional pixels without reducing the quality (e.g., corresponding to the total distance that the mirror displaces) of the pixel. The second example plate geometry 502 includes three example mirror attachments 104. Alternatively, any number of mirror attachments may be used. For example, the third example plate geometry 504 is a three-legged hexagon-shaped pixel structure with one example mirror attachment 104. The example extended flexural beams 302 are attached to the example support posts 108 and the example top plate 106. Alternatively, the example flexural beam 107 of FIGS. 1A-1B may attach to the example support posts 108 and the example top plate 106.

In the illustrated example plate geometries 500, 502, 504 of FIGS. 5A-5D, the support posts 108 may be grounded, thereby grounding the example extended flexural beams 302 and the example top plate 106 are also grounded. The example extended flexural beams 302 include a spring constant corresponding to a spring force to maintain the example the top plate 106 at a first position. As the electrostatic force of the example base plate 110 increases (e.g., based on a voltage differential between the grounded top plate 106 and the biased base plate 110), the extended flexural beams 302 are stretched toward the base plate 110, thereby lowering the example top plate 106. The spring constant may be based on the material of the example top plate 106 and/or based on the dimensions of the example extended flexural beams 302. For example, the extended flexural beams 302 of the example plate geometries 502, 504 are long and wrapped around the hexagon structure before blending into the example top plate 106. Such a structure provides compliance that corresponds to a spring constant, while preserving the area-to-perimeter ratio of the top plate 106. In the illustrated example, the top plate 106 is one unified piece of material (e.g., the example top plate 106 and the example extended flexural beams 302 are the same material and structure). However, the example top plate 106 and the example extended flexural beams 302 may be different materials attached together (e.g., a first material to correspond to the spring constant of the example extended flexural beams 302 and a second material to correspond to the rigidity of the example top plate 106).

Figure 6A:
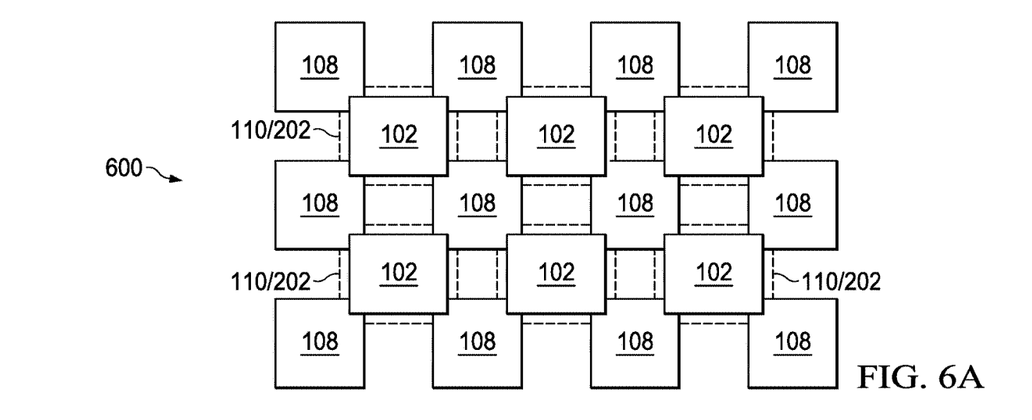
FIGS. 6A-6C are illustrations of an example pixel array with over-travel protection.
Figure 6B:
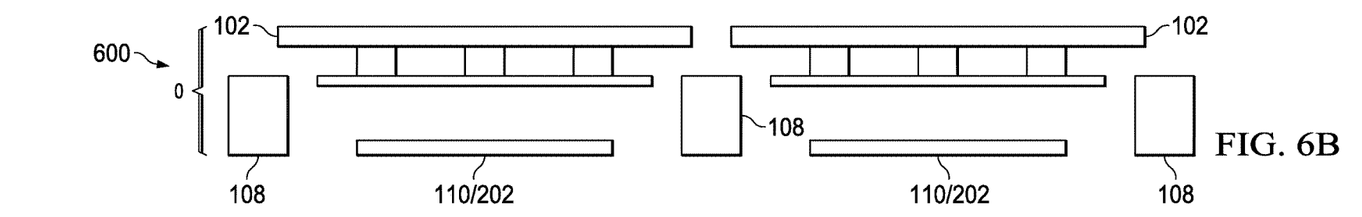
Figure 6C:
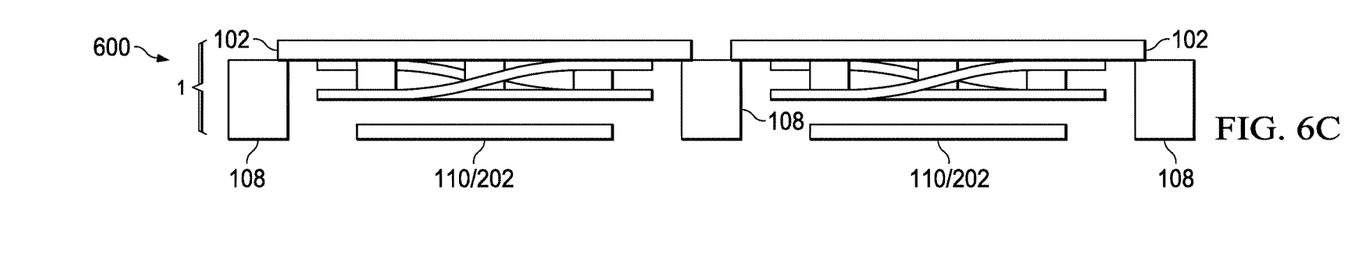

FIGS. 6A-6C illustrate an overhead view and a side view of an example pixel array 600 with over-travel protection. The example pixel array 600 includes the example mirror 102 of the structures 100, 200, 300 of FIGS. 1-3, the example base plate 110 or the example actuator 202 of FIGS. 1-3, and the example support posts 108 of FIGS. 1-3.

The example pixel array 600 of FIGS. 6A-6C includes the example mirrors 102 above the example base plates 110 or actuator 202. Additionally, the edges of the example mirrors 102 overlap the example support posts 108, thereby providing a stop to the example mirrors 102. In this manner, the example mirrors 102 are prevented from moving lower than the height of the example support posts 108, as shown in the side view. In some examples, the example support posts 108 may be located in a different position to provide a stop. For example, the support posts 108 may be located at the sides of the example mirrors 102 so that the mirror 102 overlaps the support posts 108 on the side of the mirror. In the example pixel array 600, each mirror 102 is supported by four support posts 108. Alternatively, each mirror 102 may be supported by a different number of support posts. For example, some pixel arrays may include two support posts for each pixel. Although the example mirror 102 corresponds to a square geometry, the example pixel array 600 may include any type of pixel of any geometry. Although the example pixel array 600 includes six pixels with twelve support posts 108, the example pixel array 600 may include any number of pixels with any number of support posts.

Figure 7:
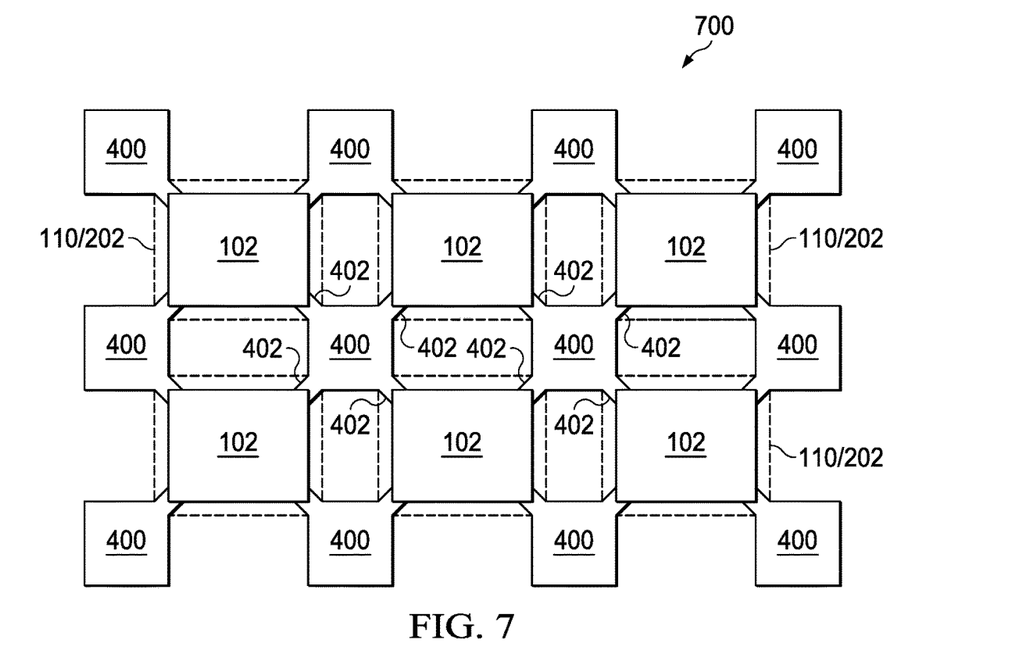
FIG. 7 is an illustration of an example pixel array that are protected with over-travel protection from the example springed structural posts of FIGS. 4A-4D.

FIG. 7 illustrates an overhead view an example pixel array 700 with over-travel protection. The example pixel array 700 includes the example mirror 102 of the structures 100, 200, 300 of FIGS. 1-3, the example base plate 110 or the example actuator 202 of FIGS. 1-3, and the example springed support posts 400 of FIG. 4.

The example pixel array 700 of FIG. 7 includes the example mirrors 102 above the example base plates 110 or actuator 202. Additionally, the edges of the example mirrors 102 overlap the example springed ledges 402 of the example springed support posts 400, thereby providing a stop (e.g., and a possible launch) to the example mirrors 102. In this manner, the example mirrors 102 are prevented from moving lower than a predefined height based on the spring constant (e.g., flexibility) of the example springed ledges 402. In some examples, the example springed support posts 400 may be located in a different position to provide a stop. For example, the springed support posts 400 may be located at the sides of the example mirrors 102 with the example springed ledges 402 extending from the side of the example springed support posts 400. In this manner, the mirror 102 overlaps the spring ledges 402 on the side of the mirror. In the example pixel array 700, each mirror 102 is supported by four spring ledges 402. Alternatively, each mirror 102 may be supported by a different number of springed support posts and/or springed ledges. For example, some pixel arrays may include two springed support posts and/or springed ledges for each pixel. Although the example mirror 102 corresponds to a square geometry, the example pixel array 700 may include any structures of any type of geometry. Although the example pixel array 700 includes six pixels with twelve springed support posts 400, the example pixel array 700 may include any number of pixels with any number of support posts.

Figure 8:
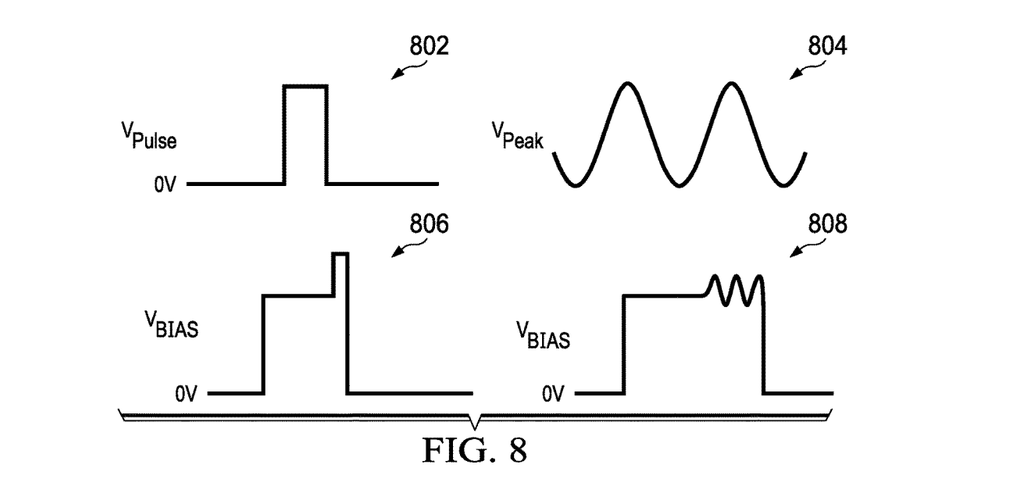
FIG. 8 is an illustration of example waveforms that may be utilized by an example electrode voltage controller of FIGS. 1A-1B and/or an example actuator controller of FIGS. 2A-2B.

FIG. 8 illustrates four example waveforms 802, 804, 806, 808 that may be implemented by the example electrode voltage controller 112 and/or the example actuator controller 208 of FIGS. 1-2. As explained above, the voltage applied to the example electrode voltage controller 112 correlates to the position of the example mirror 102. For example, the higher the voltage applied to the example electrode voltage controller 112, the closer the mirror 102 moves to the example base plate 110. Likewise, the signal applied by the example actuator controller 208 correlates to the position of the example mirror 102.

The first example waveform 802 of FIG. 8 is a voltage pulse that moves the example mirror 102 from a first position (e.g., the first position of FIG. 1A) to a second position (e.g., the second position of FIG. 1B) when the voltage goes from 0 Volts (V) to a high voltage. The first example waveform 802 may be used in a digital based approach, where the mirror 102 is moved between two positions corresponding to a low voltage and a high voltage. The second example waveform 804 of FIG. 8 is a sinusoid-shaped waveform. The second example waveform 804 may be used to move the example mirror 102 to various positions for an analog based approach of operation.

The third example waveform 806 of FIG. 8 is a voltage pulse with an overdrive pulse at the end of the pulse. As described above in conjunction with FIGS. 4A-4D, the example overdrive pulse may be used in conjunction with the example springed support posts 400 of FIGS. 4A-4D to temporarily drive the example top plate 106 closer to the example base plate 110. The overdrive pulse of the third example waveform 806 may utilize the spring constant of the example spring ledge 402 of FIGS. 4A-4D to further pull the top plate 106 down and/or to launch the example mirror 102 to a higher position than a neutral position, thereby increasing the travel range of the example mirror 102. The fourth example waveform 808 is a voltage pulse including an analog overdrive waveform at the end of the voltage pulse. Like the example overdrive pulse of the third example waveform 806, the example fourth waveform 808 may utilize the spring contact of the example spring ledge 402 to further pull the top plate 106 down and/or to launch the example mirror 102 to a higher position than a neutral position, thereby increasing the travel range of the example mirror 102.

From the foregoing, it will be appreciated that example methods, apparatus and articles of manufacture have been disclosed for providing over-travel protection for actuators. Actuators, including electrostatic and non-electrostatic actuators, may have problems when driving a structure too close to the base of the actuator (e.g., causing over-travel). For example, electrostatic actuators may collapse if a top plate gets too close to a base plate, thereby causing damage to the actuator. In another example, non-electrostatic actuators may get stuck if a plate being driven by a piston of the actuator touches the base of the actuator. Conventional techniques for preventing over-travel include programming the actuator to prevent over-travel. However, such conventional techniques have problems due to user and/or software error and require additional parts and space. Examples disclosed herein include providing a mechanical stop to a structure that is supported by an actuator to prevent over-travel. Using example disclosed herein, over-travel is eliminated without the cost and/or space of conventional techniques.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. An apparatus in a pixel of a spatial light modulator, the apparatus comprising:
    a mirror;
    a first plate coupled to the mirror;
    a flexural beam coupled to the first plate;
    a second plate; and
    a support post coupled to the first plate via the flexural beam, the support post structured to prevent the mirror against moving within a threshold distance from the second plate,
    the flexural beam, the support post, and the first plate integrally formed of a same conductive material.

2. The apparatus of claim 1, wherein the threshold distance corresponds to a collapsing point.

3. The apparatus of claim 1, wherein the threshold distance corresponds to one third of a displacement distance between the first plate and the second plate.

4. The apparatus of claim 3, wherein, when a voltage is applied to the second plate, the first plate moves toward the second plate.

5. The apparatus of claim 1, wherein the first plate and the second plate are electrodes.

6. The apparatus of claim 1, wherein a top of the support post is between the mirror and the second plate and the mirror is partially overlapping the support post.

7. The apparatus of claim 1, wherein the support post is to prevent the first plate against moving within the threshold distance from the second plate by preventing the mirror from moving past the support post.

8. The apparatus of claim 1, wherein the threshold distance corresponds to (A) a first distance between the mirror and the first plate and (B) a second distance between the first plate and the second plate in a neutral position, the neutral position corresponding to when zero volts are applied to the second plate.

9. The apparatus of claim 1, further including a structural plate to house the mirror, the structural plate being coupled to the first plate via attachments.

10. The apparatus of claim 1, wherein the support post is grounded to ground the first plate.

11. An apparatus in a pixel of a spatial light modulator, the apparatus comprising:
    a mirror attached to a first plate;
    a support post coupled to the first plate, the support post including a ledge that extends outward from a top of the support post that is between a second plate and the mirror, the mirror partially overlapping the ledge; and
    a processor configured to apply an overdrive voltage to the second plate to pull the first plate from a first position to a second position lower than the top of the support post, wherein the pulling of the first plate to the second position causes the ledge of the support post to flex toward the second plate, the ledge to prevent the first plate from touching the second plate.

12. The apparatus of claim 11, wherein the support post is structured to prevent the mirror against moving within a threshold distance from the second plate.

13. The apparatus of claim 11, wherein the ledge corresponds to a spring constant.

14. The apparatus of claim 11, wherein the processor is further configured to apply a voltage to the second plate to pull the first plate from the first position to a third position, wherein the third position corresponds to the mirror resting on the ledge at a height even with the top of the support post, the voltage causing an electrostatic force pulling the first plate toward the second plate.

15. The apparatus of claim 14, wherein the first plate is closer to the second plate in the second position than in the third position.

16. The apparatus of claim 14, wherein the processor is further configured to apply the overdrive voltage followed by a low voltage to push the first plate further away from the second plate to a fourth position, the fourth position corresponding to the first plate being above the top of the support post.

17. The apparatus of claim 16, wherein the first position corresponds to a position of the first plate when zero volts are applied to the second plate.

18. The apparatus of claim 14, wherein the ledge applies a force opposite the electrostatic force to prevent the first plate from collapsing at the second position.

19. The apparatus of claim 16, wherein:
  the ledge corresponds to a spring constant that applies a force opposite the electrostatic force to prevent the first plate from collapsing at the second position; and
  when the processor applies the low voltage after the overdrive voltage, the spring constant of the ledge provides upward force to push the first plate away from the second plate to the fourth position.

* * * * *